Jan. 13, 1970  R. R. TRACY  3,489,375
VARIABLE LIFTING SURFACE CRAFT
Filed Nov. 21, 1967  3 Sheets-Sheet 1
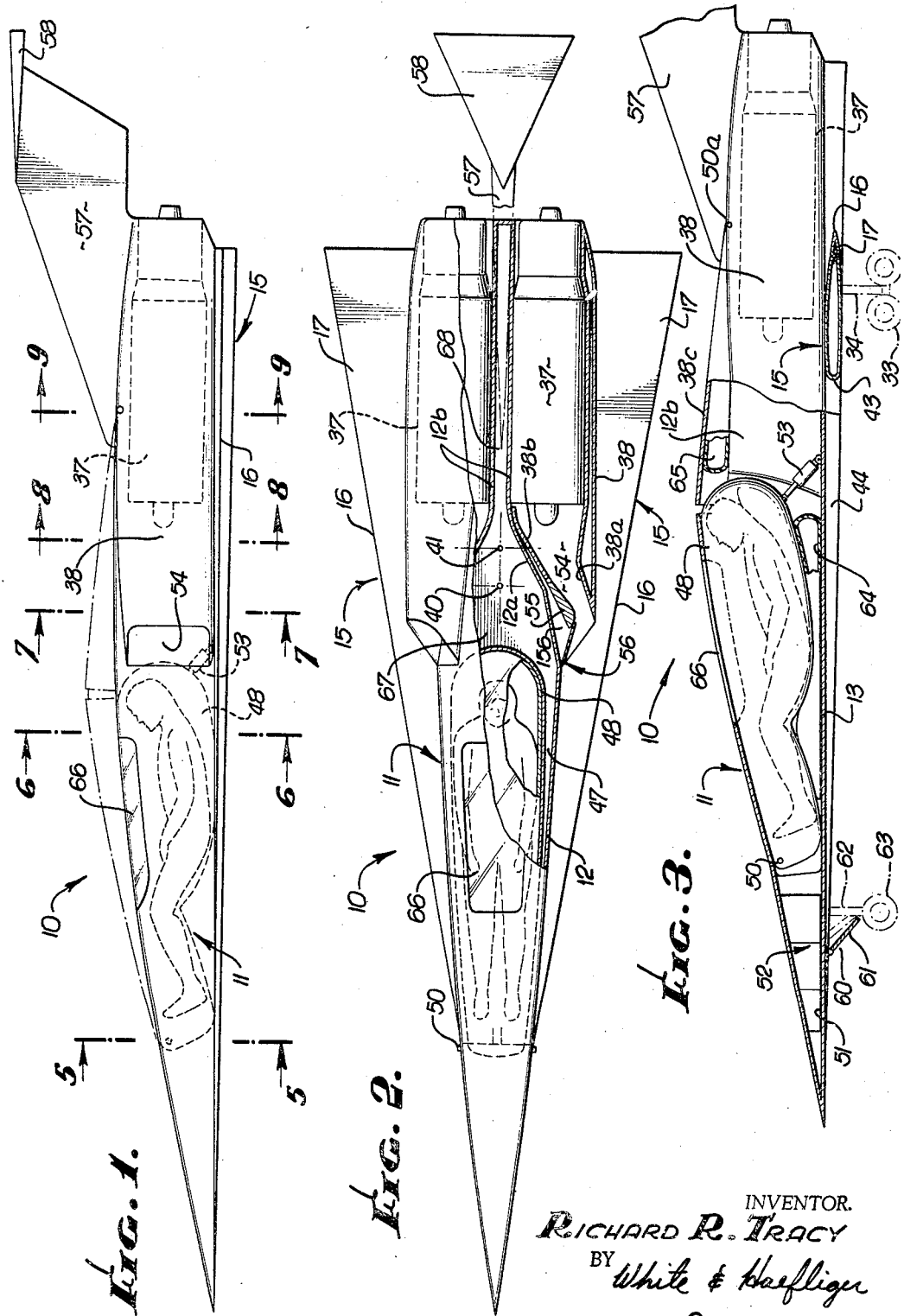
INVENTOR.
RICHARD R. TRACY
BY White & Haefliger
ATTORNEYS.

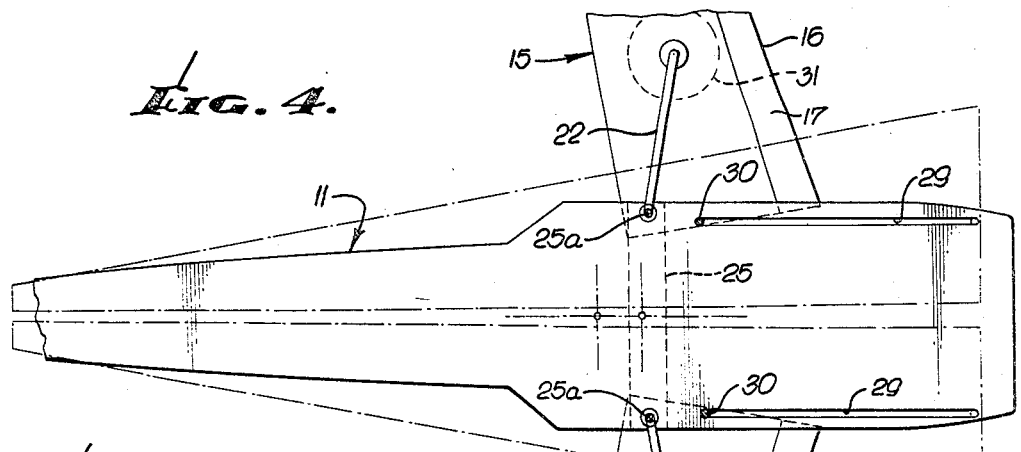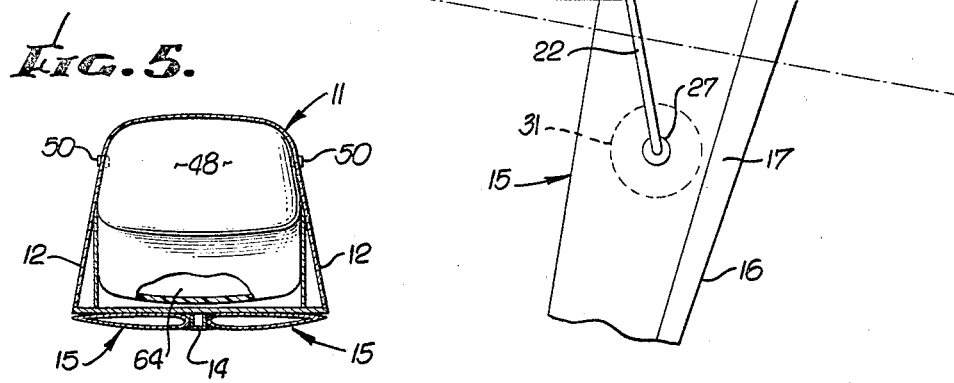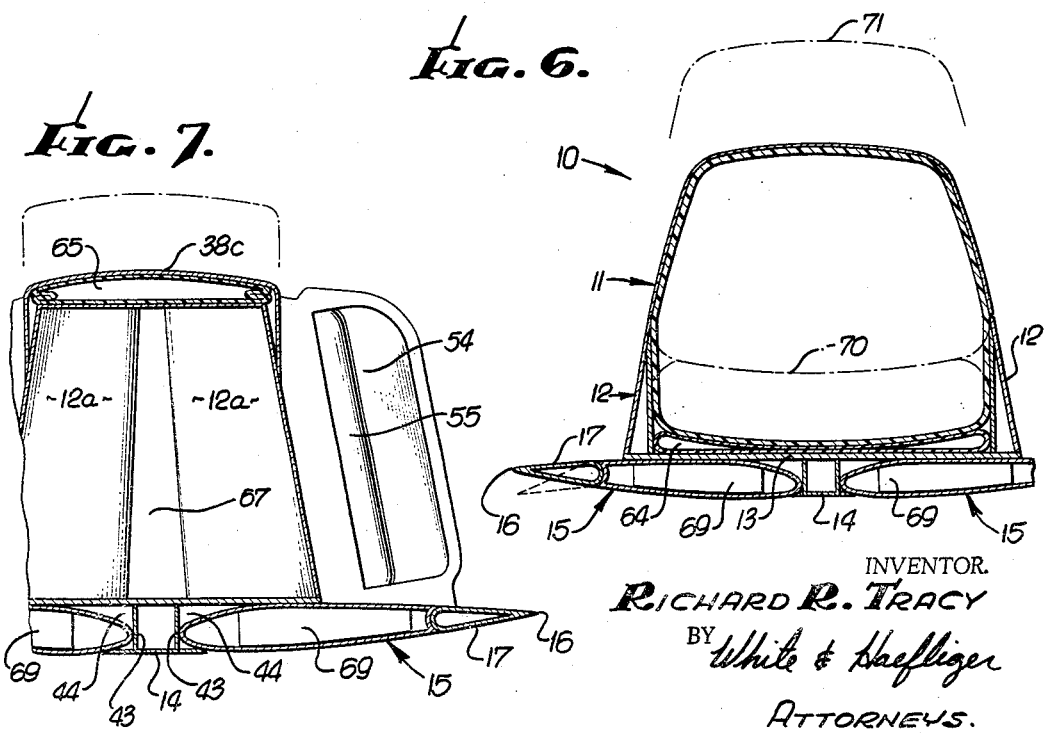

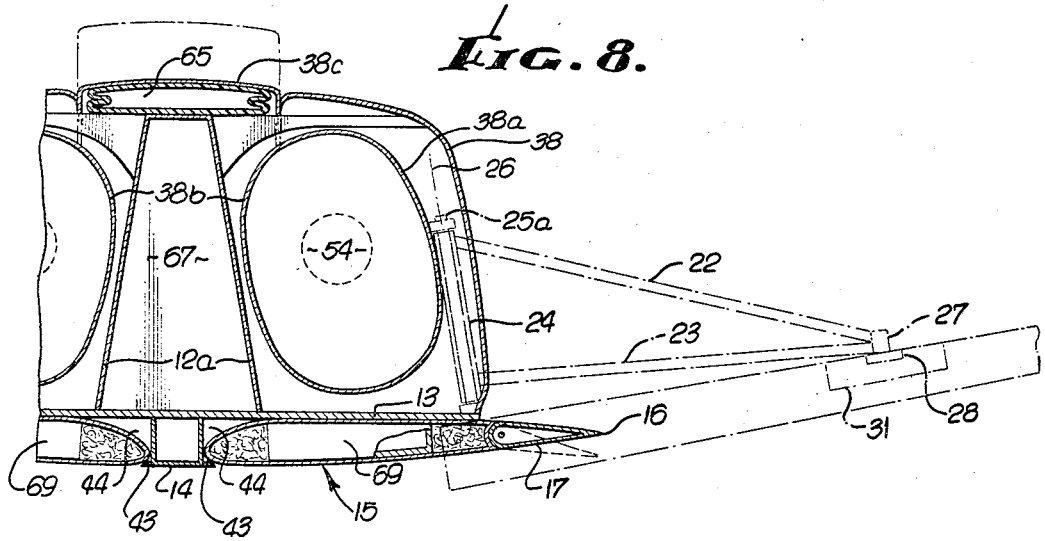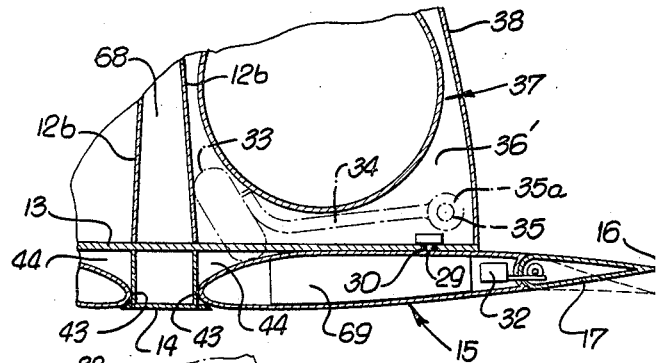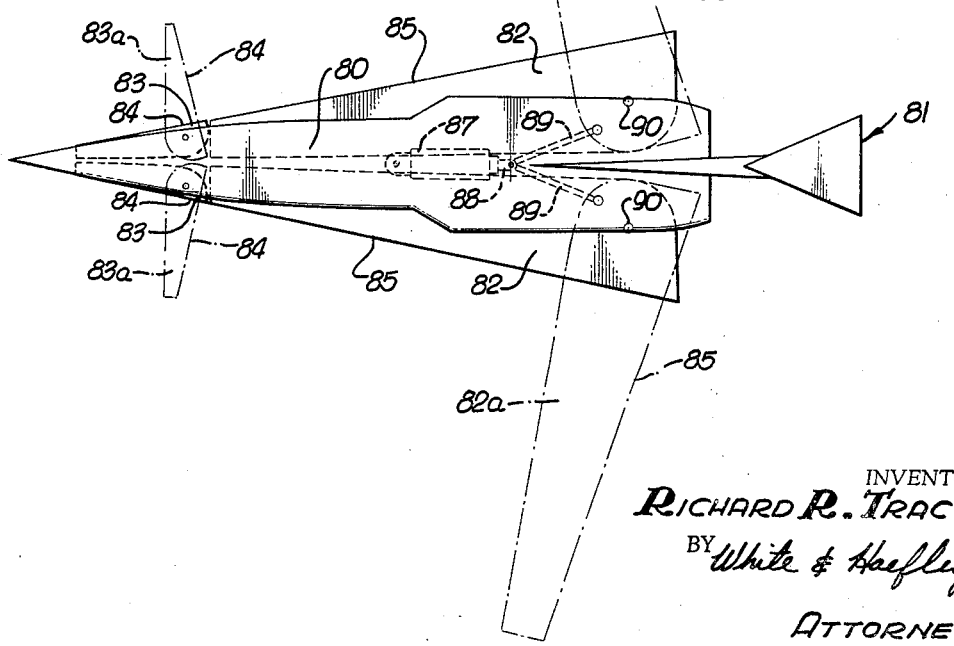

United States Patent Office 3,489,375
Patented Jan. 13, 1970

3,489,375
VARIABLE LIFTING SURFACE CRAFT
Richard R. Tracy, 32 Brocadero Place,
Pasadena, Calif. 91105
Filed Nov. 21, 1967, Ser. No. 684,662
Int. Cl. B64c 3/38
U.S. Cl. 244—46    12 Claims

ABSTRACT OF THE DISCLOSURE

The invention concerns aircraft with forwardly folding wings and other improvements better accommodating both subsonic and supersonic flight requirements.

Background of the invention

This invention relates generally to supersonic aircraft, and more specifically relates to advancements in variable geometry (or folding) wing designs to better accommodate both subsonic and supersonic flight requirements.

An aircraft wing configuration which meets the requirements for low speed flight while landing and taking off is not compatible with the requirements for efficient cruising at high speeds. The minimum speed at which an airplane can sustain flight depends inversely upon the wing area and maximum lift coefficient, thus the low speed requirement dictates a large wing employing a high lift configuration (moderately thick leading edge and highly cambered. On the other hand, for minimum drag at high speed, the wing should have a much smaller area and/or employ a low drag configuration (thin leading edge and only slightly cambered).

Because of this conflict it has long been an established practice to employ a variable geometry wing on high performance aircraft, in order to achieve either a change in wing area, or in maximum lift coefficient. Simple mechanisms such as flaps, slats and slots permit a change in wing configuration which can produce a two- or three-fold increase in maximum lift coefficient. Thus, since the best lift coefficient for efficient cruise is usually considerably below the normal maximum lift coefficient without high lift devices, a factor of two to three can exist between the landing speed and the best cruising speed even without a change in wing area. (For a given aircraft weight and wing area, the lift coefficient in steady flight varies inversely as the square of the speed.)

In subsonic aircraft, this speed range of operation is great enough that additional large variations of the wing area are not employed. Even aircraft operating in the transonic and low supersonic speed range (up to about Mach 1½) can often tolerate the excess drag offered by the fixed wing better than the additional weight and bulk of a wing retracting mechanism. This is especially true because these aircraft have been able to operate with very high landing speeds (up to 200 m.p.h.) and fly at high altitude where the reduced air density partially offsets the need for a reduction of wing area (e.g., at an altitude of ten miles, the air density is about one-tenth that at sea level, and to fly, an airplane must either have ten times the wing area or fly more than three times as fast as at sea level).

In fact, even at a speed of 2000 m.p.h. (about Mach 3), the wing area is not greatly in excess of that desired for efficient cruising operation if the craft is operated at 15 miles altitude (near the upper limit for air breathing power plants), and if a ratio of from five to ten in maximum left coefficient to optimum cruishing lift coefficient can be achieved, and if a take-off or landing speed in the 150–200 m.p.h. range is acceptable. However, previously unencountered effects begin to dominate the wing drag as the flight Mach number increases much beyond unity. This source of drag arises from the fundamental unsuitability of the conventional subsonic wing profile and planform shape for supersonic flight.

The camber, rounded leading edge, and "streamlined" profile which are essential to an efficient, high lift, subsonic airfoil are of no use in producing lift in supersonic flight and are the principal sources of drag of a supersonic wing. The supersonic wing should be flat, as thin as structurally possible, and very sharp along the leading edge. Furthermore, the large aspect ratio (span squared divided by wing area) required for efficient subsonic lift is contrary to the aerodynamic requirement of extreme leading edge sweep and low aspect ratio for supersonic flight. Moreover the high aspect ratio configuration imposes large bending loads on the wing which necessitate excess structural weight and wing thickness.

The attempts to circumvent these problems in the few aircraft designed for Mach 2–3 cruise flight have led to a variable geometry wing which primarily affects the planform. The wings pivot near the root and are rotated aft to achieve leading edge sweep and reduced aspect ratio. The structural load on the wing is essentially unaffected since the entire weight of the craft is still supported by the same length of wing section. The wing profile section is a compromise between the demands of subsonic and supersonic flight and is further adapted, by means of flaps, slats, etc., to low-speed flight conditions. However, the wing profile is still too curved and thick for optimum supersonic performance.

Swinging the wings aft from the root moves the "center of pressure," or point of effective lift, aft as well. This change in the pitching movement aggravates the already serious problem that arises inevitably during the transition from subsonic to supersonic flight as the "aerodynamic center" moves aft from about the quarter-chord point to near the mid-chord of the wing.

Summary of the invention

It is a major of the invention to provide means for overcoming the problems discussed above. Basically, the aircraft environment comprises a body, and wings carried by the body for presentation to the fluid or air in body lifting relation. In this environment the invention is embodied in wings movable with respect to the body and between rearwardly extended position for subsonic flight and forwardly retracted position for supersonic flight, the wings having certain edges that are presented rearwardly in wing extended positions and presented outwardly away from the body in wing retracted positions. As will be seen, the wings typically have other edges that are presented forwardly in wing extended positions, the body having recesses extending forwardly at its opposite sides to receive those other edges in wing retracted position, and further each wing then tapers forwardly in retracted position. In this regard, if a high aspect ratio, tapered wing with a conventional subsonic profile section is rotated forward about a pivot placed near the wing root, it can be seen that by continuing the rotation until the wing is nested in the fuselage, the sharp trailing edge becomes the leading edge of a highly swept, nearly flat wing. It is well to list the characteristics of this wing in its two configurations:

| Characteristic | Configuration | |
|---|---|---|
| | Subsonic (Extended) | Supersonic (Retracted) |
| Position | Projecting outboard | Nested forward. |
| Aspect Ratio | High (>>1) | Low (=1). |
| Sweep | Little or none | Large (60° or more). |
| Camber | As required | None. |
| Thickness Ratio | do | Reduced by a factor of about ten. |
| Leading Edge | Rounded | Sharp. |
| Trailing Edge | Sharp | Blunt. |
| Wing Area | As required | Same or reduced by about half. |
| Center of Pressure | "Quarter Chord" | Slightly forward. |
| Structural Characteristic. | Wing cantilevered from pivot. | Wing supported along its length. |

It is seen that virtually all of the desired qualities are attained in each of the configurations. Furthermore, if the extended wing has essentially straight taper, then the retracted supersonic configuration is "conical." The three principal advantages are listed again for emphasis:

(1) Cambered, rounded airfoil becomes slender, sharp, uncambered section.
(2) High aspect ratio planform becomes high sweep, low aspect ratio shape.
(3) Greatly increased structural support for wing in retracted configuration.

In addition, the wing support and pivoting mechanism may employ arms or struts to augment bending strength while the wing is extended and to establish a dihedral angle between the wings. The pivot and actuating mechanism may be articulated to provide a retraction geometry which is favorable with respect to fore and aft center of pressure shifts during retraction. Finally, secondary pairs of surfaces may be provided which similarly retract, in place of or in addition to, the conventional horizontal stabilizer and control surface.

Additional features and objects of the invention include the provision of flexible bladder fuel chamber means carried by the body in confined proximity to the pilot compartment; and the provision of landing flap means carried by the wings, a forward landing wheel with support structure to support lowering of the wheel from the body, and a canard surface carried by the wheel support structure to be presented to impingement of air for creating lift tending to compensate for pitching of the body induced by lowering of the flap means.

These and other objects and advantages of the invention, as well as the details of illustrative embodiments, will be more fully understood from the following detailed description of the drawings, in which:

Brief description of the drawings

FIG. 1 is a side elevation showing one preferred form of aircraft incorporating the invention;

FIG. 2 is a top plan view of the FIG. 1 aircraft, with wings retracted;

FIG. 3 is an elevation view of the aircraft, taken in partial vertical section, with wings extended;

FIG. 4 is a partial top plan view, like FIG. 2, but showing the wings extended;

FIGS. 5-9 are vertical sections taken on lines 5—5, 6—6, 7—7, 8—8 and 9—9 of FIG. 1; and FIG. 10 is a top plan view showing a modified form of the invention.

Detailed description of embodiments

Referring first to FIGS. 1-4, and 6, the aircraft 10 includes a forwardly extending body 11, which may for example comprise laterally spaced, forwardly elongated upright rails 12 interconnected by base plate structure 13, and forwardly elongated beam structure 14 integral with the base and projecting centrally below same. In this regard, the rails 12 and beam 14 may be metallic and hollow for storing fuel, and at the same time lending needed torsional and bending strength.

Wings 15 are carried by the body for presentation to the fluid or air in body lifting relation, as better illustrated in FIG. 4. In this regard, the wings are movable with respect to the body and between rearwardly extended positions (as seen in FIG. 4) and forwardly retracted positions (as for example are illustrated in FIGS. 1 and 2). As will be seen the wings have certain edges 16, as for example are defined by landing flaps 17, that are presented rearwardly in extended positions, and which furthermore are presented outwardly away from the body in retracted positions.

In accordance with a further aspect of the invention, connector structure including swingable arm means may be provided to operatively interconnect the body and each of the wings so that the latter have dihedral angularity overcoming adverse effects of forward sweep of the wings in extended positions. Such forward sweep is illustrated in FIG. 4, and may for example be embodied in the structure to facilitate guided retraction of the wings to retracted position. In this regard, reference is also made to FIG. 8 showing purely illustrative swingable arm members 22-24 forming a triangular frame hinge connected to a body lateral beam 25 at hinge pin location 25a, to swing about axis 26. The outer terminus 27 of the frame has pivotal connection to the wing at 28. The wing and body also have guided (as for example T-slot and block) interconnection to facilitate guided retraction and extension of the wing. Merely as illustrative, note the forwardly elongated slot 29 in base 13, along which a pin 30 carried by the wing is guided, as better seen in FIGS. 4 and 8. Such interconnections also transfer loads from the wing to the body and vice versa.

Also illustrated in FIGS. 4 and 8 are typical actuators 31 for effecting movement of each wing between extended and retracted positions, as accommodated by such swinging movement of the arms as to maintain the center of lift in approximately the same position during wing movement. The rotary actuator may typically have a shaft fixed to the swingable arm at location 28 and a housing mounted within the wing. Actuators for the flaps 17 are shown at 32 in FIG. 9 as typically contained within the wings. Note also in FIG. 9 the downward exposure of the retracted wings, beneath body base 13. Finally, FIG. 9 also illustrates retracted positions, within the body cavity 36, of main landing wheels 33 and struts 34, the latter having pivotal connection to the body typically at 35. Actuators for extending and retracting the wheel supports are seen at 35a. The retracted wheels typically may nest in cavity 36 adjacent the jet engines 37. Body outer shell also appears in FIG. 9 at 38.

The aircraft construction illustrated has an aerodynamic center at 40 and a center of gravity at 41. Note also that general flatness of the wings with certain edges 16 that are relatively sharp and other edges 43 that are relatively blunt. The latter edges are received in recesses 44 in wing retracted position, such recesses extending forwardly at opposite sides of the body beam structure 14. Such recesses extend along the major length of the body and also below the pilot compartment 47 as well as below the jet engines 37, whereby the wings are structurally supported by the base 13 during high speed flight. Such recesses might alternatively be located amidships or at upper structure. In this regard, compartment 47 is formed between forward portions of the side rails 12, which are spaced apart sufficiently to receive a pilot capsule 48 as best seen in FIG. 2. The body tapers in a forward direction at and forward of the pilot compartment, and the capsule 48 is hinged at 50 to swing upwardly for discharging the capsule in an emergency. A capsule ejector is seen at 53, and a window at 66. Compartment 51 forward of the pilot compartment contains auxiliary equipment such as radio, navigation, power supply and control units 52. The ejector means 53 normally serves as an actuator to elevate the capsule 48 about pivot 50 to an angle which affords the pilot a more nearly sitting attitude as well as improved vision through window 66 during take-off and landing. In combination with aft capsule fairing 38c which pivots about hinge axis 50a, the raised capsule 48 additionally improves the subsonic aerodynamic flow around the body 10 and provides additional space within the craft for fuel needed for starting and take-off as will be explained.

The engines 37 are suspended or mounted at laterally outward sides of rear portions 12b of the rails 12, as best seen in FIG. 2. Those portions 12b merge with rail portions 12a tapering rearwardly in the zone between the pilot compartment and the engines. Engine air inlets 54 are formed laterally outwardly of the portions 12a between an inner duct wall 38b, near 12a and the body shell structure 38a. Variable position throats or nozzles 55 at the inlets control the entrance areas of the inlets 54, such areas being enlarged for subsonic flight. Boundary layer air bleeds from openings 56 to space 156 and is discharged through engine compartments 36'. The tail fin 57 and horizontal stabilizer are carried by the body at the rear thereof to extend above the wake of the engine exhaust, as indicated in the drawings.

A further aspect of the invention concerns the provision of a canard surface 60 consisting of a panel 61 located ahead of support strut 62 for forward landing wheel 63. Surface 60 is presented to impingement of air for creating lift tending to compensate for pitching moment caused by lowering of the flaps 17 during landing or takeoff. The surface 60 is normally retracted when the landing gear is retracted and serves as a fairing cover for the front gear well, however it may be controllably operated by the pilot to assist in longitudinal control, especially at transonic speeds.

A still further aspect of the invention has to do with the provision of flexible bladder fuel chamber means carried by the body in confined proximity to the pilot compartment. Such fuel chamber means may be located at 64 directly below the capsule; and at 65 directly below the body panel 38c in FIG. 3. Additionally, fuel may be stored in a main tank 67 between rail sections 12a, in the space 68 between rail sections 12b, in the hollow beam 14, and in the hollowness of the wings as at 69. Take-off fuel is typically stored in bladder 64 expanded to upper limit 70 in FIG. 6, the capsule 48 on take-off being partly raised as indicated at 71. Following take-off, the fuel in bladder 64 is mostly expended, and the capsule lowers to its retracted position.

Referring now to FIG. 10, the modified aircraft includes a body 80, tail section 81, rearward wings 82 and forward wings 83. Both sets of wings are movable between retracted and extended positions as indicated by the solid lines 82 and 83 and broken lines 82a and 83a, as by suitable actuators. As before, the expanded wing trailing edges 84 and 85 become the retracted wing outer edges, indicating that the wings retract by swinging forwardly. Reception of the wings in body recesses is generally the same as described above. Actuator structure for so moving the wings may include the main actuator 87, rod 88, and links 89, shown in wing extended positions. Rear wings 82 may be pivotally connected to the body as shown at 90, and the links 89 are connected to the wing roots to swing the wings between retracted and expanded positions.

I claim:
1. In a craft subjected to development of lift arising from forward motion in a fluid medium, a forwardly extending body, and wings carried by the body for presentation to the fluid in body lifting relation, the wings being angularly movable with respect to said body and between extended positions and retracted positions, the wings having certain edges elongated lengthwise of the wings that are presented rearwardly in said extended positions, said certain edges being presented outwardly away from the body and forwardly as a leading edge in said retracted positions, and said movable wings in both of said positions comprising the major planar lifting surfaces of the craft.

2. The combination of claim 1 wherein the wings have other edges that are presented forwardly in said wing extended positions, the body having recesses extending forwardly at opposite sides of the body to receive said other edges in said wing retracted positions, said certain edges of the wings tapering forwardly in retracted position to form a substantially delta configuration with the body.

3. The combination of claim 1 in which the craft wings in fully extended positions project substantially laterally outwardly away from said body, the wings being approximately flat and said certain edges being relatively sharp.

4. The combination of claim 1 in which said wings include forward and aft pairs of surfaces.

5. The combination of claim 2, including connector structure having means operatively interconnecting said body and each of said wings so that the extended wings have dihedral angularity, and actuator structure for effecting movement of each wing between extended and retracted positions as accommodated by said connector structure as to maintain the effective center of lift in approximately the same longitudinal position during wing movement between said positions.

6. The combination of claim 2, wherein the body includes base structure and forwardly elongated beam structure connected with said base structure and projecting therefrom generally vertically thereof, said recesses being formed at laterally opposite sides of said beam structure.

7. The combination of claim 6 wherein the body includes laterally spaced forwardly elongated rails interconnected by said base structure, and the body defines a forward pilot compartment carried so as to be independently movable relative to said base structure and between said rails, the body tapering in a forward direction at and forward of said compartment.

8. The combination of claim 7 including at least one forwardly elongated jet engine carried by the body aft of the pilot compartment.

9. The combination of claim 7 including flexible bladder fuel chamber means carried by said body in confined proximity to said movable pilot compartment.

10. The combination of claim 6 including a forward landing wheel, wheel strut structure to support lowering of said wheel from the body, and a canard surface associated with said wheel support structure below said body to be presented to impingement of air for creating lift tending to compensate for pitching, said canard surface covering the forward landing wheel in retracted position.

11. The combination of claim 5 wherein the wings have inboard terminals in wing extended positions which are bodily movable rearwardly relative to the craft body in response to wing movement between extended and retracted position.

12. In a craft subjected to development of lift arising from forward motion in a fluid medium, a forwardly extending body, and wings carried by the body for presentation to the fluid in body lifting relation, the wings being angularly movable with respect to said body and between extended positions and retracted positions, the wings having certain edges elongated lengthwise of the wings that are presented rearwardly in said extended positions, said certain edges being presented outwardly away from the body and forwardly in said retracted positions, and said wings having inboard terminals in wing extended position which are bodily movable rearwardly relative to the craft body in response to wing movement between extended and retracted positions.

(References on following page)

References Cited

UNITED STATES PATENTS

| | | | |
|---|---|---|---|
| 1,009,770 | 11/1911 | McKenzie | 244—46 |
| 1,018,413 | 2/1912 | Dunton | 244—46 X |
| 2,354,116 | 7/1944 | Hajek | 244—43 X |
| 2,673,047 | 3/1954 | Scarato | 244—49 |
| 2,941,752 | 6/1960 | Gluhareff | 244—46 |
| 2,941,762 | 6/1960 | Blair et al. | 244—135 |
| 3,288,400 | 11/1966 | Nazir | 244—43 |
| 3,330,501 | 7/1967 | Barber | 244—43 X |
| 3,405,280 | 10/1968 | Willox | 244—46 |

FOREIGN PATENTS 1,168,938   9/1958   France.

MILTON BUCHLER, Primary Examiner

J. L. FORMAN, Assistant Examiner

U.S. Cl. X.R.

244—43, 54, 102, 119, 135